United States Patent [19]
Leiter et al.

[11] Patent Number: 6,042,133
[45] Date of Patent: Mar. 28, 2000

[54] INDEX SHIFTER FOR BICYCLE TRANSMISSIONS

[75] Inventors: Berndt Leiter, Waigolshausen; Bernhard Johanni, Niederwerrn; Max Rumpel, Werneck; Klaus König, Mühlhausen; Klaus Stühler, Schonungen; Markus Arbeiter, Würzburg, all of Germany

[73] Assignee: Mannesmann Sachs AG, Schweinfurt, Germany

[21] Appl. No.: 08/926,818

[22] Filed: Sep. 10, 1997

[30] Foreign Application Priority Data

Jan. 14, 1997 [DE] Germany ............ 197 00 885

[51] Int. Cl.⁷ ........................................ B62M 1/02
[52] U.S. Cl. ................. 280/260; 74/489; 74/473.14
[58] Field of Search ............... 280/260; 474/80, 474/81; 74/489, 473.14

[56] References Cited

U.S. PATENT DOCUMENTS

| | | | |
|---|---|---|---|
| 5,102,372 | 4/1992 | Patterson et al. | 474/80 |
| 5,197,927 | 3/1993 | Patterson et al. | 474/80 |
| 5,524,501 | 6/1996 | Patterson et al. | 74/475 |
| 5,588,925 | 12/1996 | Arbeiter et al. | 474/81 |
| 5,615,580 | 4/1997 | Chen et al. | 74/475 |
| 5,662,000 | 9/1997 | Patterson et al. | 74/475 |
| 5,666,859 | 9/1997 | Arbeiter et al. | 74/489 |
| 5,676,020 | 10/1997 | Jordan et al. | 74/475 |
| 5,799,541 | 9/1998 | Arbeiter | 74/489 |
| 5,862,709 | 1/1999 | Kageyama | 74/489 |

FOREIGN PATENT DOCUMENTS 0676325 10/1995 European Pat. Off. .

*Primary Examiner*—Paul N. Dickson
*Assistant Examiner*—Daniel Yeagley
*Attorney, Agent, or Firm*—Nils H. Ljungman and Associates

[57] ABSTRACT

An index shifter for a bicycle transmission, which index shifter is mounted on a part of a bicycle and has a casing, a locking element with notches which is connected to a rotary hand grip, and a winding drum for actuating a cable pull. The casing has a ring-shaped recess disposed therein, in which recess a detent spring is arranged. The detent spring is braced by two feet against the casing and has a lug which engages with the locking ring. Inside the casing is a casing projection with which one foot of the detent spring can be fixed to achieve a small amount of shift play. This permits small amounts of shift play, in particular for shifting hub gears on bicycles.

20 Claims, 3 Drawing Sheets

INDEX SHIFTER FOR BICYCLE TRANSMISSIONS

BACKGROUND OF THE INVENTION

1. Field of the Invention

The present invention generally relates to an index or ratchet shifter for a bicycle transmission. The index shifter includes a casing or housing which encircles the handlebar of a bicycle and is fastened thereto, and a locking ring having notches, which locking ring is rotationally mounted in the casing and is equipped with an actuating pull or cable for actuating the bicycle transmission. The index shifter also has a detent spring including a lug and two feet, whereby the detent spring is arranged in a ring-shaped recess in the casing between a first sidewall and a second sidewall.

2. Background Information

European Patent No. 676 325 A2 discloses a ratchet or index shifter which, as shown in FIG. 1, is based on the prior art and includes a detent spring located a fixed casing and a rotary locking ring. The detent spring is generally arranged in a ring-shaped recess in the casing, which recess has two sidewalls. One or the other of these sidewalls is contacted by the detent spring as a function of the direction of rotation of the rotary locking ring. This detent spring is carried by a lug which engages in notches in the locking ring and which lug of the detent spring is braced against the notches by spring force. Because the ring-shaped recess in the casing has a span slightly greater than the length of the spring, the spring can be moved back and forth within the ring-shaped recess. This back and forth motion is equivalent to overshift in one direction, which with a derailleur gear shifting system results in shifting from a small sprocket to the next larger one.

If such an index shifter is used to actuate a bicycle transmission, in particular a gear hub, much shorter and very accurate overshifts are required, however. Because the known detent spring disclosed in European Patent No. 676 326 A2, like the detent spring in accordance with the present invention, is shaped similar to a coat hanger, the length of the spring and thus the overshift available at the moment changes as the spring deflects when passing through the interval between two notches in the locking ring. To eliminate the extension of the spring due to deflection, and thus prevent this function from resulting in changes to overshift, the stops to limit spring travel should be located somewhere other than at both ends of the ring-shaped recess.

The present invention therefore teaches that one sidewall of the ring-shaped recess can be used as a limit stop for the spring, and also that there is a casing projection between the feet at the underside of the spring, which casing projection, together with one of the feet, can form the second limit stop. This results in a shift play or clearance, which shift play can be dimensioned as desired and, most importantly, which shift play does not change during the shift process.

OBJECT OF THE INVENTION

An object of the present invention is therefore to provide an arrangement of a detent spring between a fixed casing of a detent shifter and a rotary locking ring with notches, with which arrangement an overshift is made possible which remains constant during deflection of the spring, independent of the movement of the spring during a shift.

SUMMARY OF THE INVENTION

The present invention teaches that this object can be accomplished by providing a casing projection in the recess of the casing and between the feet of the detent spring. The casing projection forms a limit stop for one of the feet of the detent spring and limits possible overshift to a defined shift play or clearance by means of the adjacent sidewall of the recess, which sidewall serves as the opposing limit stop for this foot of the detent spring.

An additional feature of the present invention is that the flow of force when retracting the actuating pull or cable is from the rotary locking ring, over the lug of the detent spring, and to the casing projection via the foot.

The above discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

BRIEF DESCRIPTION OF THE DRAWINGS

The arrangement of a detent spring with a tight and constant shift play is described with reference to three drawings in partial section, in which.

DESCRIPTION OF THE PREFERRED EMBODIMENT

Figure 1:
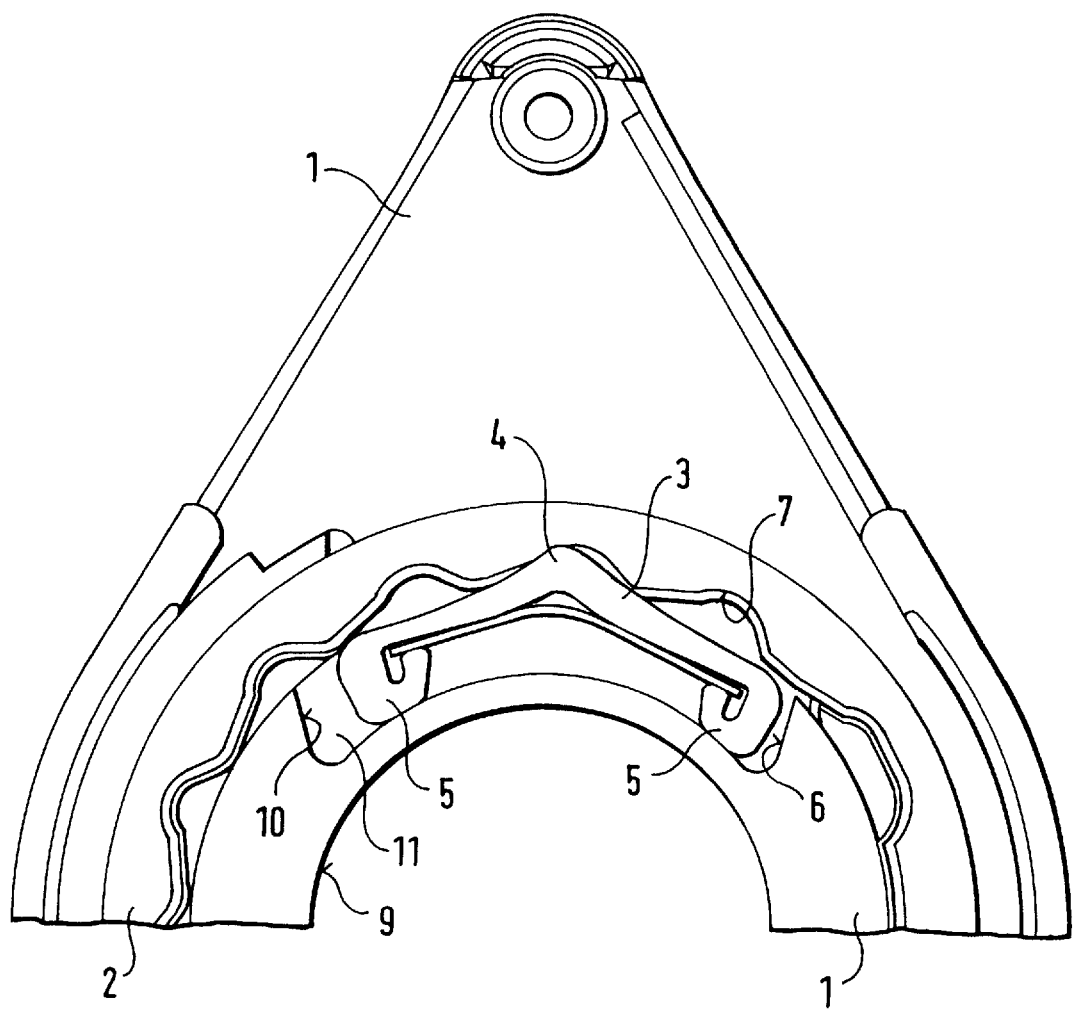
FIG. 1 shows a partial section through a known index or ratchet shifter having a casing, a detent spring and a rotary locking ring with overshift.

FIG. 1 shows a known index or ratchet shifter for actuating a bicycle transmission. The index shifter includes a casing or housing 1, which casing 1 is mounted to some part of a bicycle, preferably the handlebar. The index shifter also has a detent spring 3, which detent spring 3 has two feet 5 and a lug 4. The detent spring 3 is arranged in a ring-shaped recess having a first sidewall 6 and a second sidewall 10 disposed at opposite ends of a base portion or a third sidewall 20. The feet 5 of the detent spring 3 are braced radially inward against the casing 1, while the lug 4 is pressed radially outward against a rotary locking ring 2 having notches 7 on its inside circumference. The lug 4 engages in these notches 7 upon rotation of the locking ring 2. The casing 1 has an internal fastening diameter 9 which corresponds to the diameter of the handlebar, to which handlebar the casing 1 can be fastened.

The detent spring 3 does not fill the entire circumferential width of the ring-shaped recess, thus creating a gap 11 which allows some play upon the turning of the locking ring 2 back and forth. Particularly in the case of shifting a derailleur gear to move the chain from one sprocket to the adjacent, larger sprocket, this play permits the acceleration of the shift process by means of slight overshift. Upon completion of the shift process, the shift mechanism is returned to an adjusted stop position relative to the sprocket by releasing the shift actuating system. Such overshift is definable as the difference between the span of the ring-shaped recess in the casing 1 and the length of the detent spring 3. As mentioned above, a winding drum for winding an actuating pull or cable for actuating bicycle transmissions or derailleur gear shifting mechanisms is connected to the rotary locking ring 2. As mentioned above, the description of the shifter shown in FIG. 1 represents a known shifter, which is sufficient for the actuation of derailleur gear shifting mechanisms, but which is not sufficient for the actuation of bicycle transmissions, in particular gear hubs.

Figure 2:
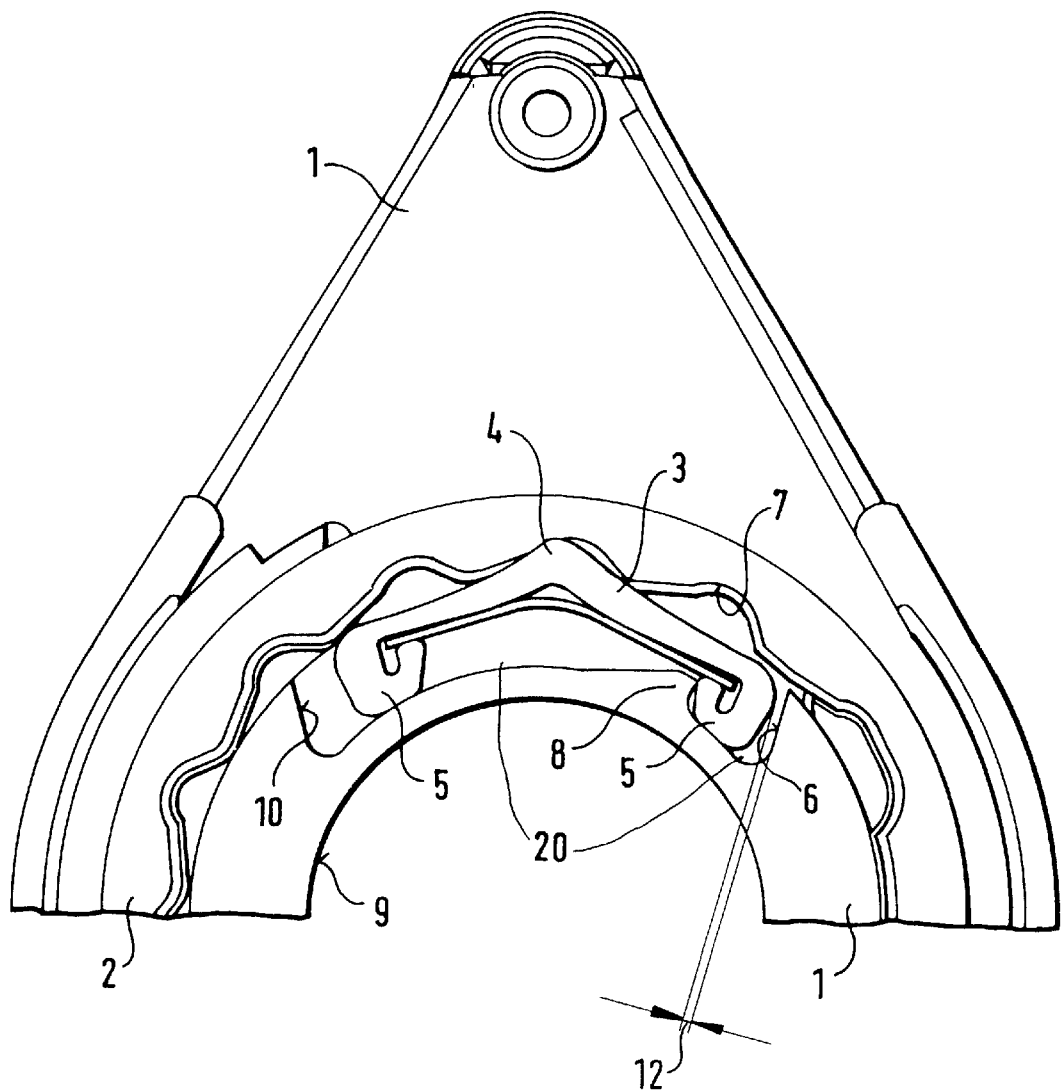
FIG. 2 shows an index or ratchet shifter as shown in FIG. 1 having a casing projection as a limit stop for one foot of the detent spring.

As shown in FIG. 2, the present invention includes an index or ratchet shifter having a casing projection 8, which casing projection 8 serves as a limit stop for the adjacent one of the two feet 5 of the detent spring 3. The projection 8 limits the movement of the detent spring 3 to a shift play 12 by means of the engagement of this foot 5 with the casing projection 8 on one side, and on the other side with the first sidewall 6. Shift play 12 can be dimensioned as desired, whereby the amount of shift play 12 can preferably be roughly equivalent to the differences in length of the transmission parts between the index or ratchet shifter and the bicycle transmission. It is of particular advantage to maintain a constant shift play 12, independent of the current deflection of the detent spring 3 when moving across the intervals between the notches 7 in the rotary locking ring 2.

In accordance with one embodiment of the present invention, the above-discussed shift play can preferably be kept constant by fixing the detent spring 3 by one of the feet 5 between the projection 8 and the sidewall 6.

It is also advantageous to fix the detent spring 3 at one end by one of its feet 5, as this results in a perceptible difference in torque between the two directions of rotation when actuating the rotary locking ring 2. For example, if the locking ring 2 is turned so that the flow of force is from the lug 4 across the spring 3 to the first sidewall 6, the actuating torque can preferably be greater in this direction of rotation than in the opposite direction. In the latter direction, the rotary locking ring 2 can pass the force across the lug 4 of the detent spring 3 to the casing projection 8 via the foot 5. Because the actuating pull or cable for shifting the bicycle transmission is tensioned by a spring in the bicycle transmission, the actuating pull is wound onto the winding drum of the rotary locking ring 2 such that the flow of force when retracting the actuating pull is from the rotary locking ring 2, across the lug 4 of the detent spring 3, and to the casing projection 8 via the foot 5.

Figure 3:
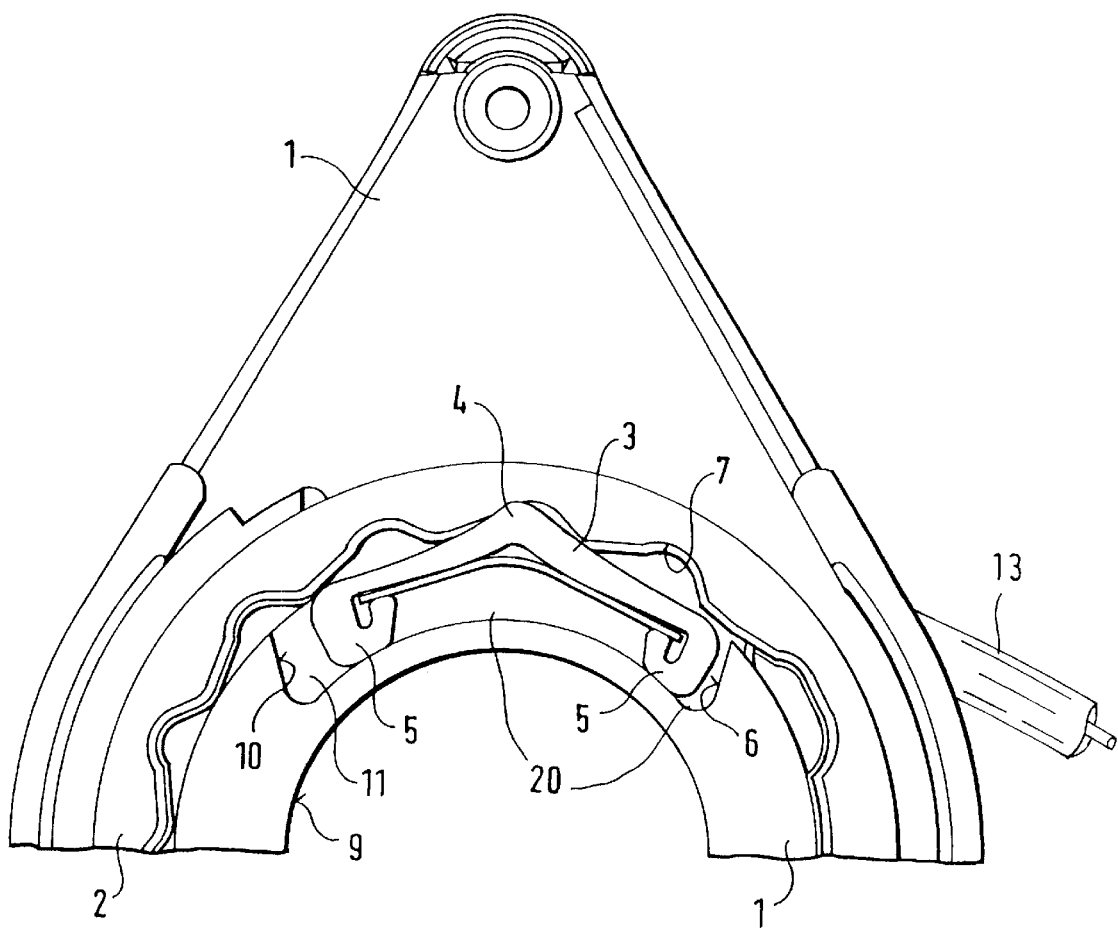
FIG. 3 shows the index shifter of FIG. 2 including a control cable.

In other words, and in accordance with one embodiment of the present invention, if the locking ring 2 is turned in a clockwise direction with respect to FIGS. 2 and 3, the flow of force is from the locking ring 2 to the lug 4, across the spring 3 to sidewall 6, a larger degree of force will be necessary to shift in this direction, since the abutting of the foot 5 adjacent sidewall 6 with the sidewall 6 may force the lug 4 radially outwardly and deeper into the notch 7 in which the lug 4 is located at the beginning of a shifting movement. However, this clockwise rotation of locking ring 2 can be somewhat aided by a spring in the bicycle transmission which biases a control cable 13 (see FIG. 3) out of the twist-grip shifter, which spring places a biasing force on the locking ring 2 in the clockwise direction, since the cable 13 is fastened to part of the locking ring 2.

In accordance with this embodiment, in the opposite direction, that is, when the locking ring 2 is rotated in a counterclockwise direction with respect to FIGS. 2 and 3, the flow of force is from the locking ring 2 to the lug 4 to the projection 8 via the foot 5 located adjacent the projection 8. This counterclockwise movement of the locking ring 2 can preferably result in a stretching of the detent spring 3, by means of the radially inward pressure of the locking ring 2 on the lug 4 in combination with the retaining of the foot 5 by the projection 8 while the locking ring 2 moves in the counterclockwise direction. This stretching of the detent spring 8 can make the movement of the lug 4 from one notch 7 to another during rotation of the locking ring 2 in the counterclockwise direction easier, as the lug 4 will be moved radially inward and out of the notch 7 due to this stretching. In the counterclockwise direction of rotation of the locking ring 2, the cable 13 can preferably be retracted into the shifter and wound around the winding drum (not shown) of the locking ring 2. This retraction of the cable 13 into the shifter can preferably be against the action of the spring in the bicycle transmission, which spring, as discussed above, typically biases the cable 13 out of the twist-grip shifter. That is, the transmission spring typically biases the locking ring 2, to which the cable 13 is connected to, in a clockwise direction. Thus, the rotation of the locking ring 2 in a counterclockwise direction, which rotation is against the biasing force of the transmission spring, can be made easier by the stretching of the detent spring 3 discussed above. Further, since the movement of the locking ring 2 in a clockwise direction, which movement requires more force due to the pushing of the lug 4 deeper into the notch 7, is somewhat aided by the biasing force of the transmission spring which biases the cable 11. As such, the forces necessary to upshift or downshift can be balanced out with respect to one another.

In accordance with an alternative embodiment of the present invention, an additional projection could also be located on the underside of the detent spring 3 and between the two feet 5. In accordance with this embodiment, the detent spring projection can be located between the casing projection 8 and one of the feet 5, which detent spring projection would interact with the casing projection 8 instead of the foot 5, as described hereinabove. In accordance with yet another alternative embodiment, there could be two casing projections which extend from housing 1, and an additional projection extending from detent spring 3. The detent spring projection can be located between the two housing projections and also between the two feet 5.

One feature of the invention resides broadly in the index or ratchet shifter comprising a casing 1 which encircles the handlebar of a bicycle and is fastened thereto; a locking ring 2 with notches 7, which locking ring 2 is rotary mounted in the casing 1 and equipped with an actuating pull for actuating the bicycle transmission: a detent spring 3 having a lug 4 and feet 5, whereby the detent spring 3 is arranged in a ring-shaped recess in the casing 1 between a first sidewall 6 and a second sidewall 10, characterized by the fact that a casing projection 8 is located in the recess of the casing 1 and between the feet 5 of the detent spring 3, which casing projection 8 forms a limit stop for one of the feet 5 of the detent spring 3 and limits possible gap or overshift gap 11 to a defined shift play 12 by means of the first sidewall 6, which serves as the opposing limit stop for the foot 5.

Another feature of the invention resides broadly in the ratchet shifter characterized by the fact that the flow of force when retracting the actuating pull is from the rotary locking ring 2 over the lug 4 of the detent spring 3 to the casing projection 8 via the foot 5.

Types of transmissions for bicycles, and components thereof, which may be utilized in accordance with the embodiments of the present invention may be disclosed in the following U.S. Pat. Nos. 3,944,253; 4,973,297; 4,721,015; 4,063,469; 4,727,965; 4,721,013; 4,651,853; 4,628,769; 4,400,999; 5,273,500; and 5,443,279.

Examples of bicycles, in which the embodiments of the present invention may be employed, may be found in the following U.S. patents: U.S. Pat. No. 5,324,059; No. 5,312,125; No. 5,242,182; and No. 5,240,268.

Examples of derailleurs may be found in the following U.S. patents: U.S. Pat. No. 4,439,171; No. 4,231,264; No. 4,183,255; and No. 3,927,904.

Some examples of twist-grip shifters which may be used in accordance with the embodiments of the present invention, may be disclosed in the following U.S. patents: U.S. Pat. No. 3,218,879; No. 5,134,897; No. 4,938,733; No. 4,900,291; and No. 5,102,372.

The components disclosed in the various publications, disclosed or incorporated by reference herein, may be used in the embodiments of the present invention, as well as, equivalents thereof.

All, or substantially all, of the components and methods of the various embodiments may be used with at least one embodiment or all of the embodiments, if more than one embodiment is described herein.

All of the patents, patent applications and publications recited herein are hereby incorporated by reference as if set forth in their entirety herein.

The corresponding foreign patent publication applications, namely, Federal Republic of Germany Patent Application No. 197 00 885.2, filed on Jan. 14, 1997, having inventors Berndt Leiter, Bernhard Johanni, Max Rumpel, Klaus Konig, Klaus Stuhler, and Markus Arbeiter, and DE-OS 197 00 885.2, and DE-PS 197 00 885.2, are hereby incorporated by reference as if set forth in their entirety herein.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clause are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. An index shifter for a bicycle transmission, said index shifter comprising:
   a housing to be disposed on a handlebar of a bicycle, said housing comprising a recess disposed therein;
   said recess comprising a first sidewall and a second sidewall;
   a ring element rotationally mounted within said housing to actuate a control cable of a bicycle transmission;
   said ring element comprising a plurality of notches disposed therein;
   a detent spring disposed within said recess of said housing and disposed between said first sidewall and said second sidewall;
   said first sidewall and said second sidewall being disposed a distance from one another, said distance being sufficient to permit movement of said detent spring within said recess to provide shift play;
   said detent spring comprising:
      a projecting lug disposed to alternately engage ones of said plurality of notches; and
      a first end and a second end disposed opposite one another;
   a projection disposed within said recess of said housing, said projection being disposed between said first end of said detent spring and said second end of said detent spring;
   said projection being disposed as a limit stop for said first end of said detent spring;
   said projection and said first side wall being configured to form a depression between them;
   said first end of said detent spring being disposed in said depression between said projection and said first side wall;
   said depression between said first side wall and said projection having a width extending between said projection and said first side wall;
   said first end of said detent spring having a width extending between said projection and said first side wall;
   the width of said depression being greater than the width of said first end of said detent spring; and
   said projection, said first sidewall and said detent spring together being configured and disposed to limit movement of said first end of said detent spring in said depression to maintain a substantially constant play of said first end of said detent spring within said depression to provide a substantially constant shift play of said detent spring within said recess.

2. The index shifter according to claim 1 wherein said first end of said detent spring is configured to remain in said depression between said first side wall and said projection upon said projecting lug engaging any of said plurality of notches.

3. The index shifter according to claim 2 wherein a control cable is retractable into said index shifter against the biasing force of a transmission spring, and further wherein:
   said ring element is movable in a first direction of rotation and a second direction of rotation, said first direction of rotation being opposite to said second direction of rotation;
   said ring element being disposed and configured to retract a control cable into said index shifter upon being rotated in said first direction of rotation; and
   said ring element, upon being rotated in said first direction of rotation, being disposed and configured to transmit a force to said projecting lug, from said projecting lug of said detent spring to said first end of said detent spring, and from said first end of said detent spring to said projection.

4. The index shifter according to claim 3 wherein said housing comprises said projection.

5. The index shifter according to claim 4 wherein:
   said recess of said housing comprises a base portion extending between said first sidewall and said second sidewall;
   said projection extending outwardly towards said detent spring from said base portion of said recess; and
   said first end of said detent spring and said second end of said detent spring both being disposed immediately adjacent said base portion of said recess.

6. The index shifter according to claim 5 wherein said index shifter is configured for use with a hub bicycle transmission.

7. The index shifter according to claim 6 wherein:
said detent spring comprises a first leg and a second leg, said first leg extending from said projecting lug to said first end of said detent spring;
said second leg extending from said projecting lug to said second end of said detent spring; and
said first leg being disposed at a substantial angle with respect to said second leg to form said projecting lug.

8. The index shifter according to claim 7 wherein:
said ring element is rotatable with respect to said housing and said detent spring;
said ring element being disposed and configured to extend a control cable out of said index shifter upon being rotated in said second direction of rotation; and
said ring element, upon being rotated in said second direction of rotation, being disposed and configured to transmit a force to said projecting lug, from said projecting lug of said detent spring to said first end of said detent spring, and from said first end of said detent spring to said first sidewall.

9. An index shifter for a bicycle transmission, said index shifter comprising:
a housing to be disposed on a bicycle, said housing comprising a recess disposed therein;
a ring element rotationally mounted within said housing to actuate a control cable of a bicycle transmission;
said ring element comprising a plurality of notches disposed therein;
a detent spring disposed within said recess of said housing, said detent spring being movable within said recess to provide shift play;
said detent spring comprising:
a projecting lug disposed to alternately engage ones of said plurality of notches; and
a first end and a second end disposed opposite one another;
a projection disposed within said recess of said housing, said projection being disposed between said first end of said detent spring and said second end of said detent spring;
said projection being disposed as a limit stop for said first end of said detent spring;
a stop surface disposed adjacent said projection;
a depression in said recess formed by said projection and said stop surface;
said first end of said detent spring being disposed in said depression; and
said projection and said stop surface both being disposed to limit movement and provide a substantially constant play of said first end of said detent spring within said depression to maintain a substantially constant shift play of said detent spring within said recess.

10. The index shifter according to claim 9 wherein:
said first end of said detent spring is configured to remain in said depression between said stop surface and said projection upon said projecting lug engaging any of said plurality of notches; and
said projection and said stop surface both being disposed to limit movement of said first end of said detent spring within said depression to maintain a substantially constant shift play of said detent spring within said recess.

11. The index shifter according to claim 10 wherein:
said recess of said housing comprises a first sidewall and a second sidewall disposed a distance from one another, said distance being sufficient to permit movement of said detent spring within said recess to provide the shift play;
said detent spring being disposed between said first sidewall and said second sidewall; and
said first sidewall comprising said stop surface.

12. The index shifter according to claim 11 wherein a control cable is retractable into said index shifter against the biasing force of a transmission spring, and further wherein:
said ring element is movable in a first direction of rotation and a second direction of rotation, said first direction of rotation being opposite to said second direction of rotation;
said ring element being disposed and configured to retract a control cable into said index shifter upon being rotated in said first direction of rotation; and
said ring element, upon being rotated in said first direction of rotation, being disposed and configured to transmit a force to said projecting lug, from said projecting lug of said detent spring to said first end of said detent spring, and from said first end of said detent spring to said projection.

13. The index shifter according to claim 12 wherein said housing comprises said projection.

14. The index shifter according to claim 13 wherein:
said ring element is disposed and configured to extend a control cable out of said index shifter upon being rotated in said second direction of rotation; and
said ring element, upon being rotated in said second direction of rotation, being disposed and configured to transmit a force to said projecting lug, from said projecting lug of said detent spring to said first end of said detent spring, and from said first end of said detent spring to said first sidewall.

15. The index shifter according to claim 14 wherein:
said ring element is rotatable with respect to said housing and said detent spring;
said housing being configured for being disposed on a handlebar of a bicycle;
said recess of said housing comprises a base portion extending between said first sidewall and said second sidewall;
said projection extending outwardly towards said detent spring from said base portion of said recess; and
said first end of said detent spring and said second end of said detent spring both being disposed immediately adjacent said base portion of said recess.

16. The index shifter according to claim 15 wherein:
said detent spring comprises a first leg and a second leg, said first leg extending from said projecting lug to said first end of said detent spring;
said second leg extending from said projecting lug to said second end of said detent spring; and
said first leg being disposed at a substantial angle with respect to said second leg to form said projecting lug.

17. The index shifter according to claim 16 wherein said index shifter is configured for use with a hub bicycle transmission.

18. A method of operating an index shifter for a bicycle transmission, said method comprising the steps of:
rotating a ring element having a plurality of notches within a housing of the index shifter;

alternately engaging a projecting lug of a detent spring with ones of the plurality of notches of the ring element and actuating a control cable of a bicycle transmission to shift the gears of the bicycle transmission;

moving the detent spring within a housing recess of the housing to provide shift play during said step of rotating;

positioning an end of the detent spring in a depression formed between a projection disposed within the recess and a sidewall of the recess, the projection being configured to serve as a limit stop for the end of the detent spring, the end of the detent spring having a width extending from the projection toward the sidewall, the depression having a width extending from the projection toward the sidewall, and the width of the depression being greater than the width of the end of the detent spring; and limiting movement of the detent spring within the housing recess and maintaining a substantially constant play of the end of the detent spring within the depression with the projection disposed within the recess, the detent spring and the sidewall disposed adjacent the projection to maintain a substantially constant shift play of the detent spring within the housing recess.

19. The met hod according to claim 18 wherein: the end of the detent spring is a first end, the detent spring has a second end disposed opposite said first end; the ring element is movable in a first direction of rotation and a second direction of rotation, the first direction of rotation being opposite to the second direction of rotation; said method further comprising the steps of:

rotating the ring element in the first direction of rotation and retracting a control cable into the index shifter against the biasing force of a transmission spring; and said step of rotating comprising transmitting a force from the ring element to the projecting lug, from the projecting lug to the first end of the detent spring, and from the first end of the detent spring to the projection.

20. The method according to claim 19 wherein: the sidewall is a first sidewall, the recess in the housing has a second sidewall disposed a distance from the first sidewall, the distance being sufficient to permit movement of the detent spring within the recess to provide the shift play; said method further comprising the steps of:

rotating the ring element in the second direction of rotation and extending a control cable out of the index shifter with the assistance of the biasing force of a transmission spring; and said step of rotating comprising transmitting a force from the ring element to the projecting lug, from the projecting lug to the first end of the detent spring, and from the first end of the detent spring to the first sidewall.

\* \* \* \* \*

UNITED STATES PATENT AND TRADEMARK OFFICE
CERTIFICATE OF CORRECTION

PATENT NO.   : 6,042,133                                                                                         Page 1 of 1
DATED        : March 28, 2000
INVENTOR(S)  : Berndt Leiter, Bernhard Johanni, Max Rumpel, Klaus König, Klaus Stühler and Markus Arbeiter It is certified that error appears in the above-identified patent and that said Letters Patent is hereby corrected as shown below:

<u>Column 1,</u>
Line 19, after "located" insert -- between --.

Signed and Sealed this

Twenty-fourth Day of December, 2002

JAMES E. ROGAN
*Director of the United States Patent and Trademark Office*